June 23, 1942.　　　　R. K. OSTRANDER　　　　2,287,266
BALLISTIC GAME APPARATUS
Filed May 7, 1940　　　　2 Sheets-Sheet 1
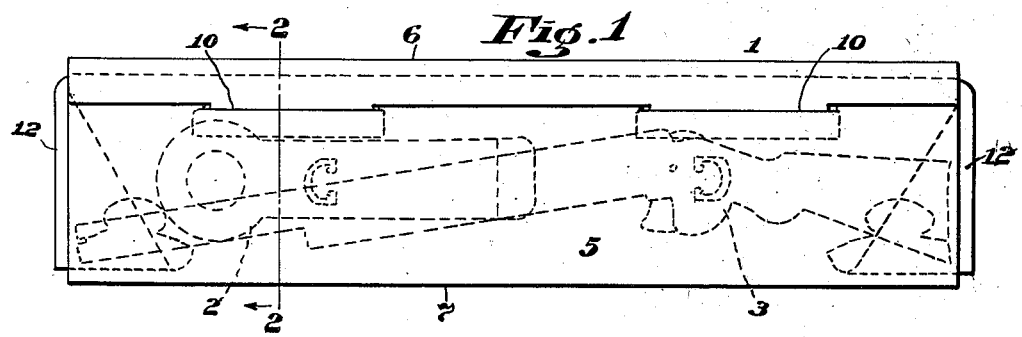
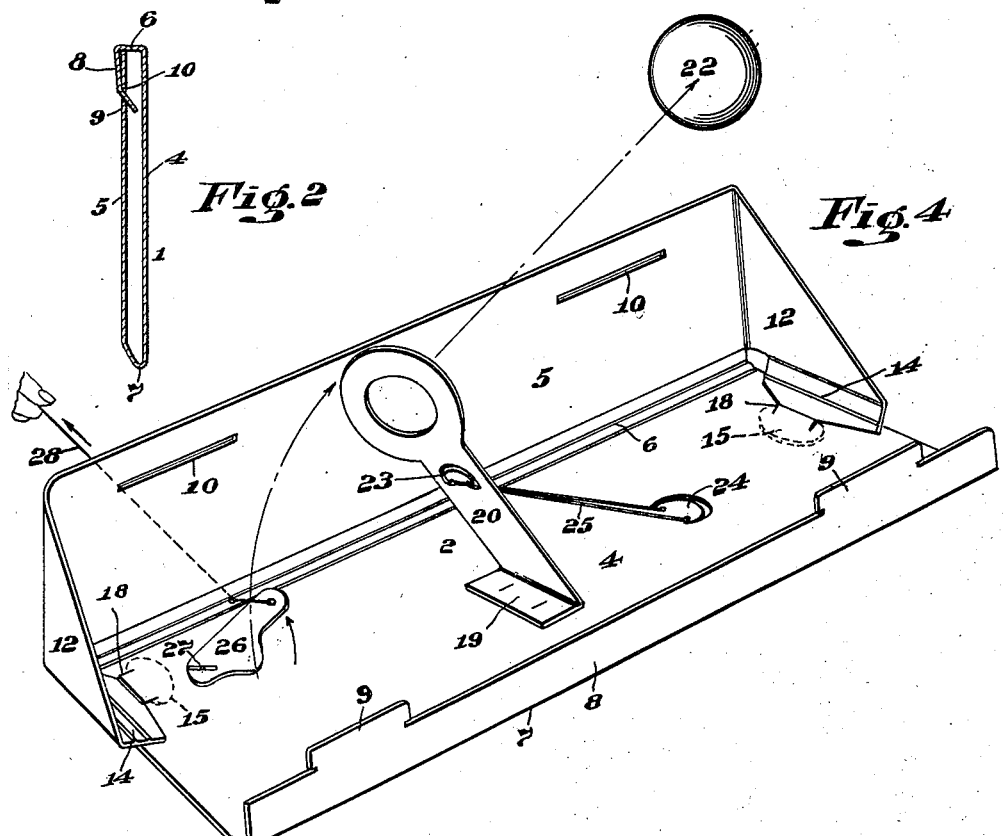
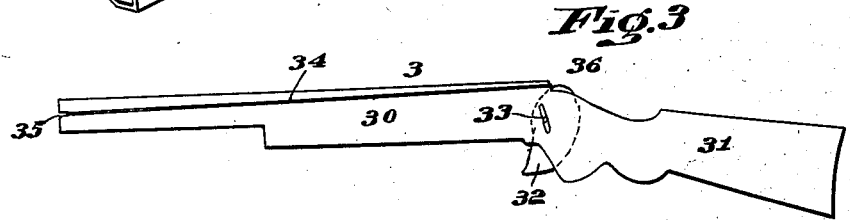
INVENTOR.
Robert K. Ostrander
BY
ATTORNEY

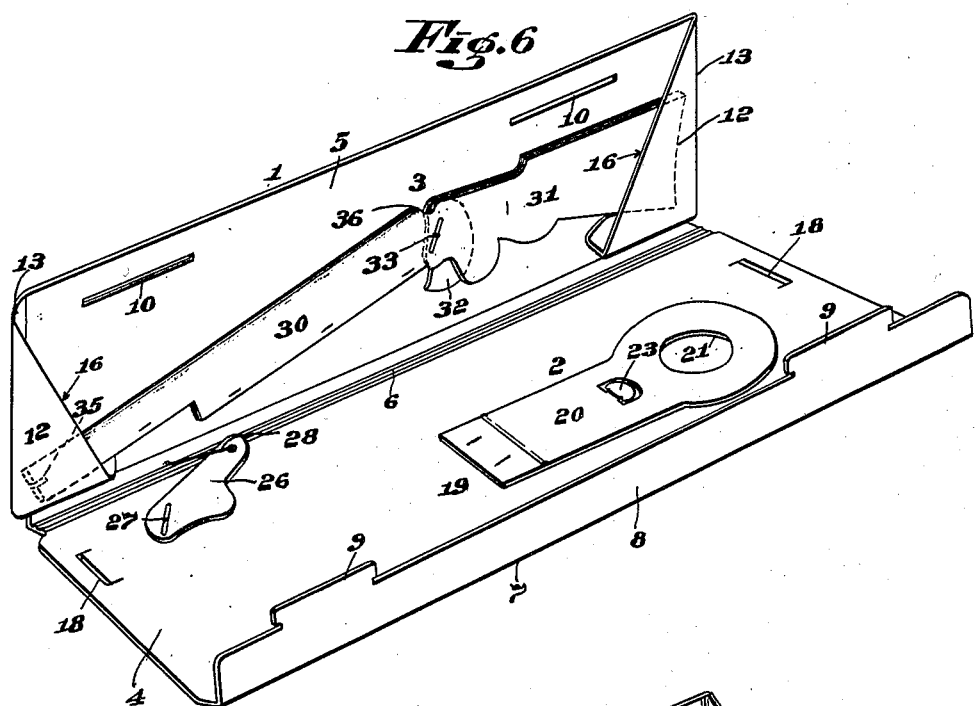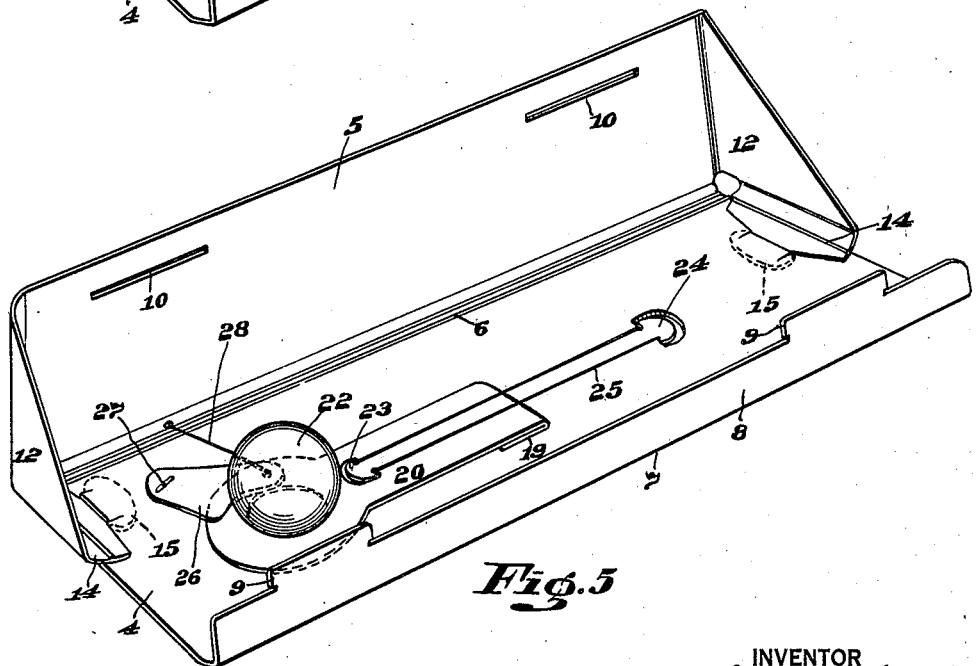

Patented June 23, 1942

2,287,266

UNITED STATES PATENT OFFICE 2,287,266

BALLISTIC GAME APPARATUS

Robert K. Ostrander, South Orange, N. J., assignor to The Forbes Lithograph Manufacturing Company, Boston, Mass., a corporation of Massachusetts Application May 7, 1940, Serial No. 333,801

4 Claims. (Cl. 124—4)

The general object of the invention is to obtain amusement and develop skill through shooting at a body projected into the air from a trap. More specifically it is the object of the invention to provide apparatus by which these general objectives may be secured, and which apparatus will include the following attributes:

An apparatus which comprises a trap housing from out of which a ball may be thrown into the air by a contained trap, and a gun by which the ball may be shot at, these elements to be made of pasteboard, or the like.

A gun of simple construction from which a harmless projectile, such as a band of rubber, may be fired.

A transformable container that will fold into a generally flat merchantable carton forming a case for the gun, and be transformable into the trap housing fashioned to rest upon any suitable base of support, and have a bottom plate upon which is arranged the trap by which the ball is thrown into the air, and, also, have a breast plate forming an upright wall back of which the trap lies concealed, and above which the ball is thrown.

A ball projector of simple and uniqque type; and one that may be sprung by gentle force applied from a distance, as through a trailing string, even by one firing the gun, and this without moving the trap housing.

The invention can best be seen and understood by reference to the drawings in which:

Fig. 1 is a side elevation of the container forming a gun case, and transformable into a trap housing with contained trap.

Fig. 2 is a section on the line 2—2 of Fig. 1.

Fig. 3 is a side elevation of the gun.

Fig. 4 is an inside view in perspective of the trap housing with the trap released and in the act of throwing a ball shown in side elevation.

Fig. 5 is like Fig. 4 excepting that the trap is shown in latched position holding the ball preparatory to its being sprung for throwing the ball.

Fig. 6 is an inside view in perspective of the trap housing with contained gun, the housing being partially disassembled preparatory to its transformation into the container shown in Fig. 1.

Referring to the drawings:

1 represents the container forming a gun case, and transformable into a trap housing with contained trap 2. 3 represents the gun.

The container 1 comprises a blank sheet of pasteboard creased and bent upon itself into individual connected plates which form respectively, the opposite sides 4 and 5 of the container with rounding edge 6 hingedly connecting these sides. The edge of the container opposite to edge 6 is closed by providing its side plate 4 with a creased extension to form a rounding edge 7 and flap 8. This flap laps on to the free edge of the side plate 5, and is secured to it by tongues 9 on the flap which extend into slots 10 in the plate.

The ends of the container are closed by triangular pieces 12 creased to fold within the container back of its side plate 5, and form rounding ends 13. The triangular pieces 12 are each lengthened along one edge by an extension 14 bearing a tongue 15. These extensions are creased to turn within the container to lie between the pieces 12, from which they extend, and the side 5 of the container, thus forming pockets 16 within which the ends to the barrel and stock of the encased gun are contained.

Located also within the container is the trap 2 secured to the side 4 of the container against which it rests. More specific reference will later be directed to this trap.

The container when opened, and the gun removed, is transformable into the trap housing with contained trap. The side plate 4 of the container, which bears the trap, forms the bottom wall of the trap housing. The side plate 5 of the carton, turned angularly to the plate 4, forms an upright breast wall back of which the trap lies concealed and above which the ball is thrown by action of the trap. The breast wall 5 is maintained in an upright position, angular to bottom wall of the trap housing, by means of the triangular pieces 12 on the ends of the plate 5. These triangular pieces are turned out and the tongues 15 on the extension 14 thereof slip into slots 18 in the plate 4 and bottom wall of the housing.

The trap 2, excepting for the elastic element associated with it, is made of pasteboard like the container. It comprises a butt 19 fixed in any suitable manner to the plate 4 or bottom wall of the trap housing. Hinged to the butt 19 is an arm or flap 20. The combined butt and arm are preferably made of the same piece of material, the hinge connection between them being secured by scoring the material. The outer end of the arm 20 is preferably enlarged, and a hole or opening 21 is formed within it in which a ball 22 may rest. Formed within the arm 20 and, also, within the bottom wall plate 4 of the trap housing are cleats 23 and 24, respectively. Passed around these cleats, thus connecting the arm to the bottom wall 4, is an elastic band 25 and this preferably an endless rubber band. The normal position of the arm 20 is one lying in the same plane with the butt 19 from which it extends, and the elastic band 25, then normally untensioned, or substantially so, acts to hold the arm in its normal position, and to return it to such position when the arm is turned back, which operation is permitted by the elasticity of the band then becoming highly tensioned. The arm may be turned back to occupy a position as shown in Fig. 5 where the arm is shown extending back over the butt 19 to which it is hinged to lie within a plane parallel with the butt and bottom wall of the trap housing to which the butt is secured. The arm is in this retracted position when released for throwing the ball previously placed upon it.

The arm 20 is retained in its retracted position by a latch 26 pivoted to the bottom wall of the trap housing by a pin 27. The latch is releasable from a distance by a string 28 connected to the latch and extending through the breast wall or joint between it and the bottom wall of the housing. The latch may be released without disturbing the housing by gentle pull on this string, and even by one holding the gun in position for firing at the ball when thrown. The reason for this easy release of the latch is that the arm 20 held by the latch is bearing against the latch with very little pressure. Although the elastic 25 is then highly tensioned and exerting pull upon the arm, yet this pull, when the arm is in its latched retracted position, is substantially at dead center with relation to the arm, thus exerting but little force to displace it, and bringing but little bearing force on the latch which can easily be released. The weight of the ball, also, assists in relieving strain on the latch although in practice a very light balloon-like ball is preferably used.

The gun 3 like the transformable container is also preferably made of pasteboard. The gun is one of that type which shoots an elastic band. It comprises parts blanked out and folded to form a barrel 30 and a stock 31 for the barrel. The parts forming the stock are separated by an insert to leave an open space within which is arranged a trigger 32 pivoted to the fore end of the stock by a pin 33. 34 represents an elastic band which is fired by the gun. This band is laid across the end of the barrel to fit within a slot 35 therein, and then, by stretching, brought back and passed around an edge or shoulder 36 at the inner end of the barrel just forward of the trigger, and from which edge the elastic is displaced and shot when released by action of the trigger.

I claim:

1. A ballistic game apparatus comprising a container having when closed exposing spaced sides, a bottom edge forming portion flexibly connecting said sides, end forming pieces inturned between said sides, and a trap attached interiorly to one of said sides; said container being convertible when open into a trap housing from out of which a ball may be thrown from said trap, said one of said sides forming a bottom wall bearing said trap, the opposite one of said sides angularly turned forming an upright breast wall from behind and above which a ball may be thrown from said trap, and said end forming pieces when outturned forming supports for said breast wall.

2. A ballistic game apparatus comprising a container having when closed opposing spaced sides, a bottom edge forming portion flexibly connecting said sides, and forming pieces inturned and extending to form pockets located between said sides and within which the end of a gun may be contained, and a trap attached interiorly to one of said sides; said container being convertible when open into a trap housing from out of which a ball may be thrown from said trap, said one of said sides forming a bottom wall bearing said trap, the opposite one of said sides angularly turned forming an upright breast wall from behind and above which a ball may be thrown from said trap, and said end forming pieces when outturned forming supports for said breast wall.

3. A ballistic game apparatus comprising a trap housing including a bottom wall and a breast wall rising therefrom, a trap attached to said bottom wall including a retractable arm hingedly attached to said bottom wall, and an elastic element between said arm and said bottom wall connecting respectively therewith and tensioned by retracting said arm to exert stress upon said arm at substantially dead centre thereof when said arm is in a determinate retracted position, a releasable latch pivoted to said bottom wall extensible over said arm when in its said retracted position and withdrawable therefrom for releasing said arm, and a flexible pull connection for releasing said latch extensible through and beyond said breast wall whereby said latch may be released and the trap sprung by one forward of said breast wall.

4. A ballistic game apparatus comprising a container having when closed opposing spaced sides, a bottom edge forming portion flexibly connecting said sides, end forming pieces inturned between said sides, a trap attached interiorly to one of said sides, said trap including a retractable arm hingedly attached to said one of the sides, and an elastic element between said arm and said one of the sides connecting respectively therewith and tensioned by retracting said arm to exert stress upon said arm at substantially dead center thereof when said arm is in a determinate retracted position, a releasable latch pivoted to said one of the sides and extensible over said arm when in its said retracted position and withdrawable therefrom for releasing said arm, and a flexible pull connection for releasing said latch; said container being convertible when open into a trap housing from out of which a ball may be thrown from said trap, said one of said sides forming a bottom wall bearing said trap, the opposite one of said sides angularly turned forming an upright breast wall from behind and above which a ball may be thrown from said trap, said end forming pieces when out-turned forming supports for said breast wall, and said flexible connection extensible through and beyond said breast wall whereby said latch may be released and the trap sprung by one forward of said breast wall.

ROBERT K. OSTRANDER.